United States Patent [19]

Barber et al.

[11] 4,121,912

[45] Oct. 24, 1978

[54] PARTIAL OXIDATION PROCESS WITH PRODUCTION OF POWER

[75] Inventors: Everett M. Barber, Wappingers Falls; James R. Muenger, Beacon; David L. Alexander, Fishkill, all of N.Y.; Warren G. Schlinger, Pasadena, Calif.

[73] Assignee: Texaco Inc., New York, N.Y.

[21] Appl. No.: 793,008

[22] Filed: May 2, 1977

[51] Int. Cl.² .............................. C10J 3/00; C10J 3/16; C01B 2/14
[52] U.S. Cl. .................................. 48/197 R; 48/206; 48/209; 48/212; 48/215; 60/39.02; 60/39.12; 252/373
[58] Field of Search ................ 48/197 R, 200, 201, 48/202, 203, 206, 209, 212, 215; 252/373; 60/39.02, 39.05, 39.12, 39.52, 39.18 R

[56] References Cited

U.S. PATENT DOCUMENTS

| 2,614,915 | 10/1952 | Hirsch | 60/39.12 |
| 2,660,521 | 11/1953 | Teichmann | 60/39.05 |
| 2,714,670 | 8/1955 | Linder et al. | 60/39.12 |
| 2,718,754 | 9/1955 | Lewis et al. | 60/39.52 |
| 2,722,553 | 11/1955 | Mullen et al. | 60/39.05 |
| 3,868,817 | 3/1975 | Marion et al. | 60/39.02 |
| 3,907,703 | 9/1975 | Marion | 252/373 |

FOREIGN PATENT DOCUMENTS 600,623 6/1960 Canada .................................. 60/39.02

Primary Examiner—S. Leon Bashore
Assistant Examiner—Peter F. Kratz
Attorney, Agent, or Firm—Thomas H. Whaley; Carl G. Ries; Albert Brent

[57] ABSTRACT

Power is developed by an expansion turbine in which the working fluid is a gaseous mixture comprising all of the hot raw gas stream leaving an unpacked partial oxidation gas generator, after removing if present a portion of the entrained solids, in admixture with a temperature moderating stream. A molal increase is associated with the partial oxidation process. Power is obtained from this molal increase in addition to the power obtained from the elevated pressure and sensible heat in the hot raw partial oxidation product gas. The temperature moderating stream may comprise a recycle portion of the turbine exhaust gas stream after being cooled, cleaned, optionally water-gas shifted or purified, or both, and recompressed. Alternatively, the recycle gas stream may be mixed with water, steam, or both. In one embodiment the temperature moderating stream comprises liquid water or condensate produced in the process. Auxiliary gas compressors for recompressing said recycle gas, and optionally for compressing a free-oxygen containing gas for use in the gas generation zone may be driven by said expansion turbine. Similarly, an electric generator may be coupled to the turbine shaft.

22 Claims, 1 Drawing Figure

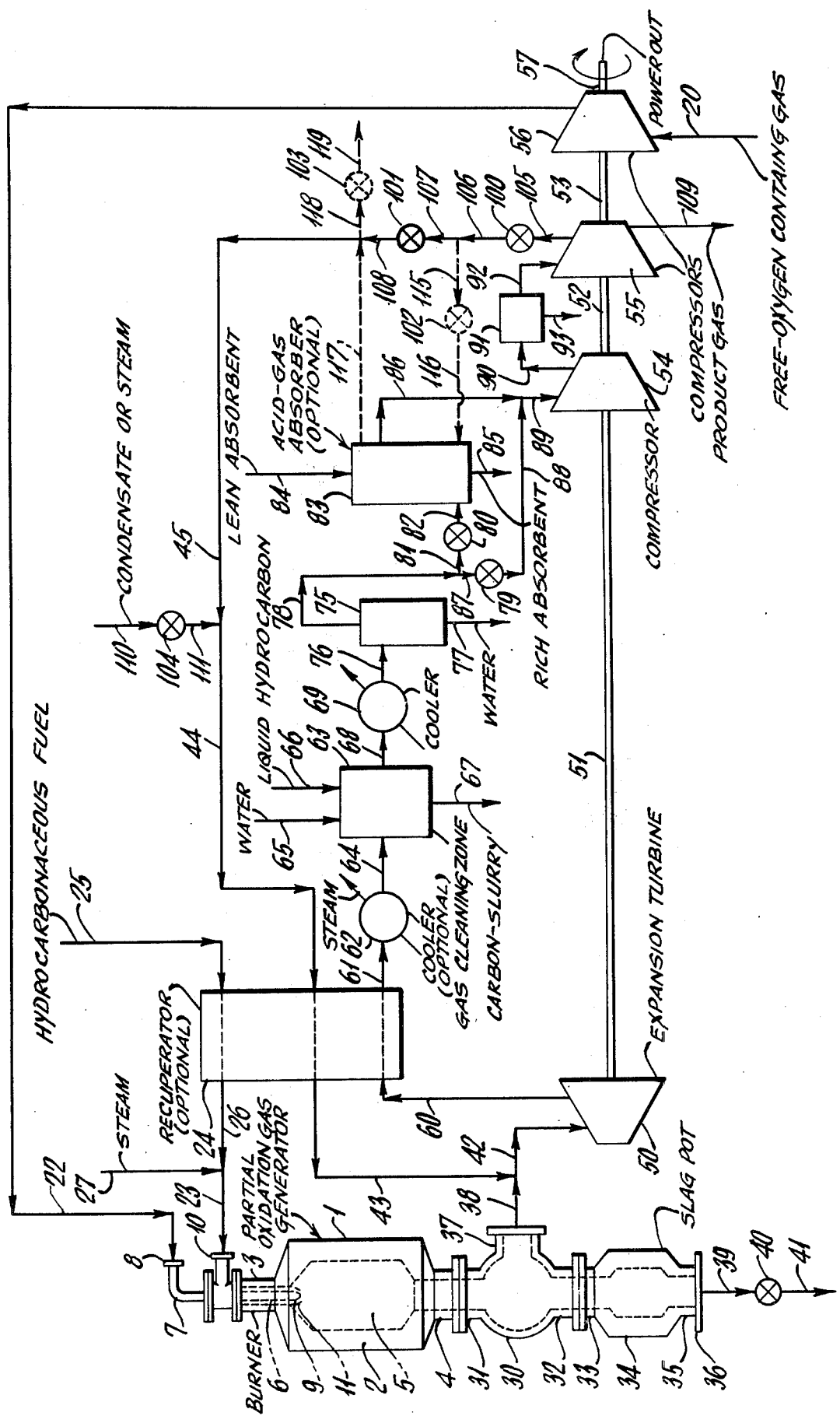

PARTIAL OXIDATION PROCESS WITH PRODUCTION OF POWER

BACKGROUND OF THE INVENTION

1. Field of the Invention

This invention pertains to a partial oxidation process for making gaseous mixtures comprising $H_2$ and CO in a gas generator and employing direct expansion of all of the moderated effluent gas stream from the gas generator in a turbine to produce power.

2. Description of the Prior Art

The temperature of the effluent gas stream from a partial oxidation gas generator is normally reduced to a temperature in the range of about 350° to 600° F. by quenching in a pool of water or by cooling by indirect heat exchange with water. Both of these methods of gas cooling result in large increases in entropy and reduced thermal efficiency. This problem is substantially overcome in the subject process by expansion cooling in a turbine a moderated effluent gas stream. In coassigned U.S. Pat. No. 3,868,817, purified fuel gas is burned in the combustor of a gas turbine. In coassigned U.S. Pat. No. 2,660,521 carbon dioxide or steam may be introduced into the combustor of a turbine or into the efflux from the combustor. Such additions may change the composition of the product gas and increase the cost of purifying the process gas stream.

SUMMARY

In the subject process, the effluent gas stream from a free-flow partial oxidation gas generator at a temperature in the range of about 1800° to 3000° F. and a pressure in the range of 10 to 300 atmospheres and comprising $H_2$, CO, $CO_2$, $H_2O$ and at least one member of the group $H_2S$, COS, $CH_4$, $N_2$, A, and entrained particulate solids may be passed through a solids separation zone and then mixed with a recycle portion of a turbine exhaust stream after said gas stream is cooled, cleaned, optionally water-gas shifted or purified or both, and recompressed. Alternatively, the recycle gas stream may be mixed with water, steam, or both. In one embodiment the temperature moderating stream comprises condensate produced in the process. The remaining portion of the process gas stream which is not recycled is removed for use as synthesis gas or fuel gas. The volume ratio of said recycle gas stream to turbine feed gas mixture may be in the range of about 0.2 to 0.8. The amounts and temperatures of the recycle process gas stream, steam, water, and the effluent generator gas stream which may be mixed together are such that the temperature of the resulting turbine feed gas mixture is a value in the range of about 1000° to 2400° F. such as about 1400° to 2200° F. say 1400° to 1900° F. By operating the turbine at higher inlet temperatures, greater power-recovery may be achieved. Further, the acid-gas concentration of the gases passing though the turbine may be reduced by removing acid gases from the turbine exhaust prior to being recycled. The cost of compressing the process gas stream with auxilliary compressors driven by said expansion turbine is considerably less than by buying electric power from a public utility.

BRIEF DESCRIPTION OF THE DRAWING

The invention will be further understood by reference to the accompanying drawing which is a schematic representation of a preferred embodiment of the process.

DRESCRIPTION OF THE INVENTION

This invention pertains to an improved continuous partial oxidation gasification process for producing synthesis gas or fuel gas along with the production of mechanical power, and optionally electrical energy. The raw gas stream from the gas generator comprises $H_2$, CO, $CO_2$, $H_2O$ and at least one member of the group $H_2S$, COS, $CH_4$, $N_2$, A and particulate carbon.

The subject process provides for the use of the heat content of the partial oxidation gases in the production of power without the requirement of extracting this heat in a high temperature heat exchanger or boiler. Such heat exchange equipment would be expensive, requiring at least the lesser of the rather high generator pressure or the rather high working fluid pressure on the shell side. The high generator temperature combines with the high hydrogen content of the generator product gases to present certain metallurgical problems in such heat exchangers. In these respects, at least, a heat exchanger to extract the high temperature heat from the generator efflux for use in a power cycle would differ significantly from usual furnace-mounted boilers and superheaters.

A molal increase is associated with the partial oxidation of all hydrocarbonaceous fuels. In the subject process, power is obtained from this molal increase in addition to the power obtained from the elevated pressure and sensible heat in the hot raw partial oxidation product gas.

By means of the subject process, it is possible to extract far more power from the inherent energy of the high-temperature high-pressure generator efflux by direct expansion than by using heat transfer to a closed Brayton-cycle power plant, even when account is taken of the recompression power. Some of the reasons for this concern reduction or elimination of thermodynamic losses. A large factor, however, is the lower energy content of the process gas stream leaving the power section in the subject process employing direct expansion.

In the subject process, a continuous effluent gas stream of raw synthesis gas or fuel gas is produced in the refractory lined reaction zone of a separate free-flow unpacked noncatalytic partial oxidation fuel gas generator. The gas generator is preferably a vertical steel pressure vessel, such as shown in the drawing and described in coassigned U.S. Pat. No. 2,992,906 issued to F. E. Guptill, Jr.

A wide range of combustible carbon containing organic materials may be reacted in the gas generator with a free-oxygen containing gas optionally in the presence of a temperature moderating gas to produce said effluent gas stream.

The term hydrocarbonaceous as used herein to describe various suitable feedstocks to the partial oxidation gas generator is intended to include gaseous, liquid, and solid hydrocarbons, carbonaceous materials, and mixtures thereof. In fact, substantially any combustible carbon containing organic material, fossil fuel, or slurries thereof, may be included within the definition of the term "hydrocarbonaceous." For example, there are (1) pumpable slurries of solid carbonaceous fuels, such as coal, lignite, wood pulp, particulate carbon, petroleum coke, concentrated sewer sludge, and mixtures thereof in water or a liquid hydrocarbon; (2) gas-solid suspension such as finely ground solid carbonaceous fuels dispersed in either a temperature moderating gas or in a gaseous hydrocarbon; and (3) gas-liquid-solid dispersions, such as atomized liquid hydrocarbon fuel or water and particulate carbon dispersed in a temperature-moderating gas. The hydrocarbonaceous fuel may have a sulfur content in the range of 0 to 10 weight percent and an ash content in the range of about 0 to 15 weight percent (wt. %) and up to 50 wt. % with solid hydrocarbonaceous fuels.

The term liquid hydrocarbon, as used herein to describe suitable liquid feedstocks, is intended to include various materials, such as liquefied petroleum gas, petroleum distillates and residues, gasoline, naphtha, kerosine, crude petroleum, asphalt, gas oil, residual oil, tar-sand oil and shale oil, coal derived oil, aromatic hydrocarbon (such as benzene, toluene, xylene fractions), coal tar, cycle gas oil from fluid-catalytic-cracking operation, furfural extract of coker gas oil, and mixtures thereof. Gaseous hydrocarbon fuels, as used herein to describe suitable gaseous feedstocks, include methane, ethane, propane, butane, pentane, natural gas, water-gas, coke-oven gas, refinery gas, acetylene tail gas, ethylene off-gas, synthesis gas, and mixtures thereof. Both gaseous and liquid feeds may be mixed and used simultaneously, and may include paraffinic, olefinic, naphthenic, and aromatic compounds in any proportion.

Also included within the definition of the term hydrocarbonaceous are oxygenated hydrocarbonaceous organic materials including carbohydrates, cellulosic materials, aldehydes, organic acids, alcohols, ketones, oxygenated fuel oil, waste liquids and by products from chemical processes containing oxygenated hydrocarbonaceous organic materials and mixtures thereof.

The hydrocarbonaceous feed may be at room temperature or it is preferably preheated to a temperature up to as high as about 600° F. to 1200° F., say 800° F. but preferably below its cracking temperature. Optionally, the hydrocarbonaceous feed may be preheated by indirect i.e. non-contact heat exchange in a recuperator with the exhaust gas from an expansion turbine employed downstream in the process and a recycle process gas stream, to be further described. The hydrocarbonaceous feed may be introduced into the burner in liquid phase or in a vaporized mixture with a temperature moderator. Suitable temperature moderators include steam, water, $CO_2$-rich gas, nitrogen in air, by-product nitrogen from a conventional air separation unit, and mixtures of the aforesaid temperature moderators.

The use of a temperature moderator in the reaction zone of the gas generator depends in general on the carbon to hydrogen ratio of the feedstock and the oxygen content of the oxidant stream. A temperature moderator may not be required with some gaseous hydrocarbon fuels, however, generally, one is used with liquid hydrocarbon fuels and with substantially pure oxygen. The temperature moderator may be introduced in admixture with either or both reactant streams. Alternatively, the temperature moderator may be introduced into the reaction zone of the gas generator by way of a separate conduit in the fuel burner.

The weight ratio of total amount of $H_2O$ to fuel introduced into the reaction zone of the gas generator is in the range of about 0 to 5.

When comparatively small amounts of $H_2O$ are charged to the reaction zone, for example through the burner to cool the burner tip, the $H_2O$ may be mixed with either the hydrocarbonaceous feedstock, the free-oxygen containing gas, the temperature moderator, or a combination thereof. In such case, the weight ratio of water to hydrocarbonaceous feed may be in the range of about 0.0 to 1.0 and preferably 0.0 to less than 0.2.

The term free-oxygen containing gas, as used herein is intended to include air, oxygen-enriched air, i.e. greater than 21 mole % oxygen, and substantially pure oxygen, i.e. greater than 95 mole % oxygen (the remainder comprising $N_2$ and rare gases). The amount of nitrogen in the product gas may be decreased by reacting substantially pure oxygen or oxygen-enriched air in the gas generator in place of air. Free-oxygen containing gas may be introduced into the burner at a temperature in the range of about ambient to 1800° F. The ratio of free oxygen in the oxidant to carbon in the feedstock (O/C, atom/atom) is preferably in the range of about 0.7 to 1.5.

The feedstreams are introduced into the reaction zone of the fuel gas generator by means of fuel burner. Suitably, an annulus-type burner, such as described in coassigned U.S. Pat. No. 2,928,460 issued to duBois Eastman et al, may be employed.

The feedstreams are reacted by partial oxidation without a catalyst in the reaction zone of a free-flow gas generator at an autogenous temperature in the range of about 1800° F. to 3000° F. such as 2000° to 2900° F., and at a pressure in the range of about 10 to 200 atmospheres absolute, such as 40 to 100 atm. abs. The reaction time in the fuel gas generator is about 1 to 10 seconds. The effluent stream of gas leaving the gas generator comprises $H_2$, CO, $CO_2$, $H_2O$ and at least one member of the group $CH_4$, $H_2S$, COS, $N_2$, A and entrained solid materials. The composition in mole % may be as follows: $H_2$ 10.0 to 68.0, CO 15.0 to 60.0, $CO_2$ 3.0 to 30.0, $H_2O$ 2.0 to 50.0, $CH_4$ 0 to 28.0, $H_2S$ 0.0 to 5, COS 0.0 to 0.7, $N_2$ 0.0 to 60.0, and A 0.0 to 1.8. Unreacted particulate carbon (on the basis of carbon in the feed by weight) is usually present in the effluent gas stream in the amount of about 0.2 to 20 weight percent with liquid feeds, but is usually negligible with gaseous hydrocarbon feeds. The specific composition of the effluent gas is dependent on actual operating conditions and feedstreams. Synthesis gas comprises mixtures of $H_2$ and CO. The $CH_4$ content may be maximized for fuel gas having a high heating value.

A continuous stream of hot effluent gas, at substantially the same temperature and pressure as in the reaction zone leaves from the axial exit port of the gas generator and is then introduced into a mixing zone. For hydrocarbonaceous fuels containing a high ash content such as coal, a solids separation zone is preferably inserted between the exit port of the gas generator and said mixing zone. The solids separation zone may comprise a catch-pot, slag chamber, cyclone separator, electrostatic precipitator, or combinations of such schemes for removing at least a portion of any solid matter i.e. particulate carbon, ash, metal constituents, scale, slag, refractory, and mixtures thereof that may be entrained in the hot effluent gas stream, or which may flow from the gas generator i.e. slag, ash, bits of refractory. The solid particles are separated from the effluent gas stream and recovered with very little, if any temperature or pressure drop in the process gas stream. A typical slag chamber that may be employed is shown in the drawing, or in FIG. 1 of the drawing for coassigned U.S. Pat. No. 3,528,930. By removing all of the solid particles above the size of about 12 microns by means of gravity or cyclone separation or other physical cleaning process, erosion of the turbine and rotor blading may be minimized.

The mixing zone may comprise any conventional means for mixing substantially all of the hot generator effluent gas stream at a temperature in the range of about 1800° to 3000° F. with a portion of cooled and cleaned recycle process gas stream at a temperature in the range of about 350° to 1000° F. The volumetric ratio of cooled and cleaned recycle process gas stream to the total gas mixture comprising effluent generator gas plus recycle gas is in the range of about 0.2 to 0.8, such as 0.4 to 0.6. The cooled and cleaned recycle process gas stream is produced downstream in the process and will be described further. Sufficient recycle process gas stream is mixed with the generator effluent gas stream in the mixing zone so as to reduce the temperature to a value in the range of about 1000° to 2400° F., such as about 1400° to 2200° F. or say about 1400° to 1900° F., and above the dew point. The pressure remains in the range of about 10 to 200 atm. abs. such as 40 to 100 atm. abs., and preferably only negligibly less than that in the gas generator. Further, the concentrations of particulate carbon and any acid-gases in the process gas stream leaving the mixing zone may be reduced.

The aforesaid gas mixture is then passed as the working fluid through a power-recovery turbine means comprising at least one power developing expansion turbine. The expansion turbine is coupled to at least one gas compressor, and optionally to an electric generator.

The exhaust gas leaves the power-recovery turbine means at a temperature in the range of about 350° to 1000° F. and with a pressure in the range of about 2 to 15 atm. abs. For example, the ratio of the turbine inlet pressure to outlet pressure may be in the range of about 6-40. Advantageously, heat is subsequently recovered from the turbine exhaust gas by indirect heat exchange in a first heat exchange zone i.e. recuperator with the recycle process gas stream on its way to the previously described mixing zone.

Next, the cooled turbine exhaust gas may be passed into a conventional gas cleaning zone to remove any entrained particulate carbon and any other entrained solids. Since substantially no particulate carbon is produced with gaseous hydrocarbonaceous fuels, the gas scrubbing step may not be necessary with gaseous fuels such as natural gas or methane. Slurries of particulate carbon in a liquid hydrocarbon fuel may be produced in the gas cleaning zone, and may be recycled to the fuel gas generator as at least a portion of the feedstock. Any conventional procedure suitable for removing suspended solids from a gas stream may be used.

In one embodiment of the invention, the expanded process gas stream after cooling in a recuperator is introduced into a gas-liquid scrubbing zone where it is scrubbed with a scrubbing fluid such as liquid hydrocarbon or water in order to remove entrained particulate carbon. A suitable liquid-gas tray-type column is more fully described in coassigned U.S. Pat. No. 3,816,382 — C. P. Marion. Thus, by passing the process gas stream up a scrubbing column in direct contact and countercurrent flow with a suitable scrubbing fluid or with dilute mixtures of particulate carbon and scrubbing fluid flowing down the column, the particulate carbon may be removed. A slurry of particulate carbon and scrubbing fluid is removed from the bottom of the column and sent to a carbon separation or concentration zone. This may be done by any conventional means that may be suitable e.g. filtration, centrifuge, gravity settling, or by liquid hydrocarbon extraction such as the process described in coassigned U.S. Pat. No. 2,992,906. Clean scrubbing fluid or dilute mixtures of scrubbing fluid and particulate carbon are recycled to the top of the column for scrubbing more synthesis gas.

Other suitable conventional gas cooling and cleaning procedures may be used in combination with or in place of the aforesaid scrubbing column. For example, the process gas stream may be introduced below the surface of a pool of quenching and scrubbing fluid by means of a dip-tube unit. Or the process gas stream may be passed through a plurality of scrubbing steps including an orifice-type scrubber or venturi nozzle scrubber such as shown in coassigned U.S. Pat. No. 3,618,296.

Optionally, if it is desired to increase the hydrogen content of the product gas while simultaneously decreasing the amount of carbon monoxide present, then the soot-free gas stream may be introduced into a conventional catalytic water-gas shift reaction zone at an inlet temperature in the range of about 350° to 700° F. CO and $H_2O$ are reacted over a conventional water-gas-shift catalyst to produce additional $H_2$ and $CO_2$. A suitable water-gas-shift catalyst may comprise iron oxide mixed with Cr oxide and promoted by 1 to 15 wt. % of an oxide of another metal, such as K, Th, U, Be, or Sb. Reaction occurs at about 500° to 1050° F. Alternatively, cobalt molybdate on alumina may be used as the water-gas shift catalyst at a reaction temperature in the range of about 500° to 900° F. Co-Mo catalysts comprise, in weight percent: CoO 2–5, $MoO_3$ 8–16, MgO nil-20, and $Al_2O_3$ 59–85. Another shift catalyst comprises a mixture of copper and zinc salts or oxides in a weight ratio of about 3 parts by weight zinc to 1 part copper. Next, substantially all of the $H_2O$ may be removed from the gas stream.

The process gas stream is dewatered by, for example, being cooled below the dew point and then separating out the condensed water. The clean dry process gas steam is then compressed. After the gas stream is compressed to a pressure slightly above that in the gas generator, a portion of the water which was previously condensed out may be optionally reintroduced into the recycle process gas stream at a point in the line located before the recuperator. The condensate may be used to moderate the temperature of the generator effluent gas in the mixing zone by direct addition to the recycle gas alone or in combination with other moderating streams such as saturated or superheated steam. This would tend to yield several advantages: (1) the water would vaporize at partial pressures rather than at the total pressure, allowing use of lower grade heat; and regeneration against the turbine exhaust will be more efficient; (2) the number of heat exchangers can be reduced from that required for separate streams; and (3) the in situ generation of steam in the recycled gas will tend to suppress undesired back reactions, such as methanation.

Depending on the desired pressure of the recycle gas stream and the product gas stream one or more conventional gas compressors may be operated from power produced by the expansion turbine. The pressure of the product gas may be less than equal to, or greater than the pressure in the gas generator. The product gas and the recycle gas stream may be removed from the same gas compressor or from separate compressors. The recycle gas stream is produced at a pressure slightly greater than the pressure in the gas generator. The gas stream may be cooled between compressors. Multistage turbines and compressors may be employed. Optionally, the free-oxygen containing gas introduced into the gas generator may be first compressed to a pressure above that in the gas generator by a separate gas compressor powered by or coupled to said expansion turbine. Optionally, an electric generator may also be powered by said expansion turbine.

In another embodiment of the invention the fuel to the partial oxidation gas generator contains sulfur compounds which appear in the effluent gas stream from the generator as $H_2S$ and COS. In such case the concentration of $H_2S$ and COS in the gas in the power loop are reduced below the level of chemical attack on the turbine and gas compressors. The cooled and cleaned exhaust turbine gas stream may be purified by removing acid-gases i.e. $H_2S$, COS, and $CO_2$ in an acid-gas absorption zone. Advantageously, this will permit reduction of the size and cost of the gas compressors, and reduce or eliminate chemical attack on them. It will also upgrade the composition of the product gas stream, and prevent environmental pollution if the product gas is used as a fuel gas. It will also prevent sulfur contamination of any downstream catalyst that the product gas may come in contact with. Further, the purified recycle gas stream will dilute the effluent generator gas and thereby reduce or eliminate any chemical attack of the expansion turbine. Alternatively, where it is more economic to remove $H_2S$ and possibly $CO_2$ at high pressure, the acid-gas absorption zone may be placed after said turbine powered gas compressors.

Any suitable conventional process may be used to remove the gaseous impurities i.e. $H_2S$, COS, $CO_2$ in the gas purification zone. For example, refrigeration and physical or chemical absorption with solvents, such as methanol, n-methylpyrrolidone, triethanolamine, propylene carbonate, or alternately with hot potassium carbonate may be used.

In solvent absorption processes, most of the $CO_2$ absorbed in the solvent may be released by simple flashing. The rest may be removed by stripping. This may be done most economically with nitrogen. Nitrogen may be available as a low cost by-product when a conventional air separation unit is used for producing substantially pure oxygen (95 mole percent $O_2$ or more) for use as the free-oxygen containing gas used in the gas generator. The regenerated solvent is then recycled to the absorption column for reuse. When necessary, final cleanup may be accomplished by passing the process gas through iron oxide, zinc oxide, or activated carbon to remove residual traces of $H_2S$ or organic sulfide.

Similarly, the $H_2S$ and COS containing solvent may be regenerated by flashing and stripping with nitrogen, or alternatively by heating and refluxing at reduced pressure without using an inert gas. The $H_2S$ and COS are then converted into sulfur by a suitable process. For example, the Claus process may be used for producing elemental sulfur from $H_2S$ as described in Kirk-Othmer Encyclopedia of Chemical Technology, Second Edition Volume 19, John Wiley, 1969, Page 353. Excess $SO_2$ may be removed and discarded in chemical combination with limestone, or by means of a suitable commercial extraction process.

A stream of dry, clean, and purified process gas leaves from the gas purification zone at a temperature in the range of about 100° to 800° F. and at a pressure in the range of about 10 to 180 atm. abs. and preferably 15 to 60 atm. abs. and having for example the following composition in mole %: $H_2$ 15 to 98, CO 1 to 75, $CH_4$ 0 to 30, $N_2$ 0.0 to 70 and A 0.0 to 2.0.

The process gas stream from the acid-gas absorption zone may be compressed to a pressure at least slightly above that in the gas generator. As previously described, a portion of the process gas stream is recycled to the mixing zone as said recycle gas stream. The remainder of the dry, clean, purified, and compressed process gas stream is removed from the compression zone as product gas i.e. synthesis gas, or fuel gas.

In another embodiment of the process, the hot effluent gas stream from the gas generator is cooled solely by introducing solids-free water in liquid phase into the process gas stream. There is no recycle of a portion of the process gas stream for use as the temperature moderator. Should the effluent generator gas stream contain entrained solids such as ash, refractory, particulate carbon etc. then a portion of the entrained solids are removed in the previously described free-flow gravity or cyclone separation zone before the cooling water is introduced. The temperature and amount of water that is introduced into the hot effluent generator gas as the temperature moderator is sufficient to cool the process gas stream from a temperature in the range of about 1800° to 3000° F. to a temperature in the range of about 1000° to 2400° F., and above the dew point. The solids-free water, in liquid phase, may be introduced in an atomized state. Boiler feed water or condensate produced elsewhere in the process may be employed. Optionally, the water may be preheated by indirect heat exchange with the turbine exhaust gas prior to being introduced into the hot effluent generator gas stream. The temperature-moderated process gas stream is then introduced into the power developing expansion turbine as the working fluid at an inlet pressure in the range of about 10 to 200 atm. abs. After expansion, in the turbine the exhaust gas leaves the turbine at a temperature in the range of about 350° to 1000° F. and a pressure in the range of about 2 to 15 atm. abs. Advantageously, heat may be recovered from the turbine exhaust gas by indirect heat exchange with the hydrocarbonaceous fuel feed, and/or as previously described by preheating the water used for moderating the temperature of the effluent generator gas. Steam may, optionally be produced by cooling the process gas stream in a gas cooler. Next, the cooled turbine exhaust gas may be cleaned, if necessary, in a conventional gas cleaning zone to remove any remaining entrained solids i.e. particulate carbon. Slurries of particulate carbon in a liquid hydrocarbon fuel or water may be produced in the gas cleaning zone, and may be recycled to the fuel gas generator as at least a portion of the feedstock. Suitable gas cooling and cleaning procedures have been previously described. Depending on the desired concentration of hydrogen in the product gas, the process gas stream may be optionally introduced next into a conventional catalytic water-gas shift conversion zone, in a manner as described previously. Similarly, the process gas stream may be next optionally introduced into a conventional gas purification zone, for removing for example acid-gases in a manner as previously described. Further, the gas purification zone may be located before or after the next step, which involves compressing the process gas stream to a desired pressure which may be less than, equal to, or greater than the pressure in the gas generator. The process gas stream is compressed by means of at least one compressor powered by said expansion turbine. Optionally, a turboelectric generator may be also driven by said expansion turbine.

DESCRIPTION OF THE DRAWING

A more complete understanding of the invention may be had by reference to the accompanying schematic drawing which shows an embodiment of the previously described process in detail. All of the lines and equipment are preferably insulated to minimize heat loss.

Referring to the figure in the drawing, free-flow non-catalytic partial oxidation gas generator 1 lined with refractory 2 as previously described has an upstream axially aligned flanged inlet port 3, a downstream axially aligned flanged outlet port 4, and an unpacked reaction zone 5. Annulus type burner 6, as previously described, with center passage 7 in alignment with the axis of gas generator 1 is mounted in inlet port 3. Center passage 7 has a flanged upstream inlet 8 and a converging conical shaped downstream nozzle 9 at the tip of the burner. Burner 6 is also provided with a concentric coaxial annular passage that has an upstream flanged inlet 10 and a downstream conical shaped discharge passage 11. Burners of other design may also be used.

A continuous stream of free-oxygen containing gas from line 20 is compressed in compressor 56, and passed through line 22 into flanged inlet 8 of burner 6. A hydrocarbonaceous fuel is introduced into burner 6 by way of line 23 and inlet 10. Optionally, the hydrocarbonaceous fuel may be preheated in recuperator 24 by way of lines 25 and 26. Optionally, steam in line 27 may be used to atomize the hydrocarbonaceous fuel.

Refractory lined or insulated flanged "T" connector 30 may be somewhat spherically shaped and is joined by inlet 31 to outlet 4 of gas generator 1. Axially aligned outlet 32 is connected to inlet 33 of insulated slag pot 34. Flanged axial outlet 35 is normally in the closed position by closing valve 40. The effluent gas stream from gas generator 1 passes through outlet 4. It then enters connector 30 through inlet 31 and leaves through outlet 37 and insulated line 38. Any slag, carbon, metals, or refractory that may separate from the effluent gas stream in connector 30 accumulates in the bottom of slag pot 34. The material in slag pot 34 is periodically removed through line 39, valve 40, line 41 or through a conventional lock-hopper system not shown.

The effluent stream of generator gas in line 38 is mixed in insulated line 42 with a temperature moderator to be further described. The mixture of gas in line 42 is passed through expansion turbine 50 as the working fluid. Expansion turbine 50 provides the power for gas compression and optionally to drive an electric generator. Thus coupled to expansion turbine 50 by shafts 51, 52, and 53 are compressors 54, 55, and 56. An electric generator (not shown) may be driven by shaft 57. Although the shafts are shown in the drawing in a straight line, they may be offset, joined by flexible couplings, or rearranged. Any suitable method may be used for utilizing the rotational power produced by expansion turbine 50.

The exhaust gas leaving expansion turbine 50 is cooled in a conventional recuperator, or gas cooler, or both. For example, the turbine exhaust gas in line 60 may be passed through recuperator 24, line 61 and optionally through gas cooler 62 where water may be converted into steam. The gas stream then enters gas cleaning zone 63 by way of line 64 where substantially all of the particulate carbon and any remaining entrained solids are removed. In a gas cleaning process as previously described, the gas stream is scrubbed with water from line 65 to produce a carbon-water dispersion. This dispersion is resolved by the addition of a liquid hydrocarbon. A carbon-liquid hydrocarbon slurry is produced which may be introduced into the gas generator as a portion of the feed. Thus, a liquid hydrocarbon may enter gas cleaning zone 63 through line 66, and the carbon-liquid hydrocarbon slurry may leave through line 67. Alternately, a carbon-water slurry may leave through line 67. The clean gas stream leaves through line 68. When it is desired to increase the hydrogen content of the product gas while simultaneously decreasing the amount of carbon monoxide, then the process gas stream in line 68 is introduced into a water-gas shift conversion zone, not shown in the drawing.

The process gas stream in line 68, or the stream of $H_2$-rich gas leaving the water-gas shift conversion zone (not shown) is dewatered and optionally purified to remove at least one acid gas from the group $CO_2$, $H_2S$, and COS. For example, the process gas stream in line 68 may be cooled below the dew point in cooler 69. The process gas stream then enters gas-liquid separator 75 by way of line 76 and water i.e. condensate is removed through line 77. The dewatered gas is removed through line 78, and with valve 79 closed and valve 80 open, the process gas stream is passed through lines 81 and 82 into acid-gas absorber 83.

Acid-gases may be removed in acid-gas absorber 83 by lean solvent absorbent which is introduced through line 84 and which leaves saturated with acid-gas, such as the rich absorbent in line 85. The purified gas leaves by line 86. When there is no need for the acid-gas absorber or when it desired to compress the process gas stream in compressors 54 and 55 prior to introduction into the gas purification zone, acid-gas absorber 83 may be by-passed by all or a portion of the process gas stream in line 78. In such case valve 79 is opened, valve 80 is closed, and the process gas stream is passed through lines 87–89 into compressor 54.

The cooled, cleaned, dewatered, and optionally purified process gas stream passes through line 89 into compressor 54. Optionally, additional gas compression may be achieved by passing the process gas through line 90, cooler 91, line 92 into compressor 55. Water may be removed through line 93.

In the preferred embodiment, with valves 100 and 101 open and valves 102–104 closed, at least a portion of the compressed process gas stream is recycled to mixing zone 42 as previously described by way of lines 105–108, 45, 44, and 43. The remainder of the compressed process gas stream leaves compressor 55 by way of line 109 as product gas and may be used as synthesis gas, $H_2$-rich gas, or fuel gas. The term $H_2$ and CO-containing gas as used herein pertains to the product gas in line 109.

Optionally, solids-free water such as condensate from line 77, or steam i.e. saturated or superheated, may be introduced into the recycle gas stream in line 44 by way of line 110, valve 104 and line 111.

In an embodiment as previously mentioned, the compressed process gas stream may be purified after compression. In such case, with valves 80, 101, and 103 closed and valves 79, 100 and 102 opened, the compressed process gas stream is passed through lines 105, 106, 115, and 116 into acid-gas absorber 83. At least a portion of the purified gas stream leaving the purification zone is passed through line 117, 45, 44, and 43 into mixing zone 42. Optionally, condensate or steam from line 110 may be mixed with the compressed purified gas in line 44. A portion of the compressed purified gas in line 117 may be discharged as product gas through line 118, valve 103, and line 119.

In another embodiment of the process, only solids-free water i.e. condensate in line 110 is used to moderate the temperature of the effluent stream of generator gas in line 38. In such case valve 100 is closed. The rest of the process is similar to the preferred embodiment including the alternate modifications described i.e. recuperator 24, water-gas shifting, and acid-gas absorber 83. Due to the heat absorbed upon evaporation, by injecting water, for example atomized water, into the hot generator gas a high cooling effect per pound of coolant may be obtained.

EXAMPLE

The following example illustrates an embodiment of the process of this invention which should not be construed as limiting the scope of the invention. The process is continuous and the quantities specified are on an hourly basis for all streams of materials.

The embodiment of the invention represented by the Example is depicted in the drawing as previously described. Raw gas is continuously produced in a free-flow noncatalytic gas generator by partial oxidation of a hydrocarbonaceous fuel with oxygen (about 98.0 volume percent purity). A summary of the temperature, pressure and quantity for the various streams in the drawing is shown in Table I below.

The effluent gas stream leaves the generator at a temperature of 2605° F. and a pressure of 1215 psia. The composition of the gas stream in line 38 of the drawing follows, in lb-moles per 100 lb. of vacuum residuum feed oil: $H_2$ 5.612, $H_2O$ 1.365, $CH_4$ 0.061, CO 6.380, $CO_2$ 0.623, $N_2$ 0.018, A 0.065, $H_2S$ 0.136, and COS 0.008.

Cooled and cleaned recycle gas from line 43 is mixed with the effluent gas stream from line 33 to produce the feed gas mixture in line 42 going to expansion turbine 50. The exhaust gas from the turbine in line 60 is cooled in recuperator 24 and exits by line 61. The process gas stream is scrubbed with water to remove any entrained particulate carbon and further cooled below the dew point to condense out water. The process gas stream is then purified in section 83 to remove $H_2S$ and COS. $CO_2$ is removed concomitantly. Section 83 may be any of the well-known acid-gas scrubbing processes commonly employed with synthesis gas generation. The process gas stream in line 86 is then compressed in compressors, 54 and 55 and any additional water may be removed between compressors. After compression the process gas stream in line 45 is mixed with condensate from line 110 to produce the mixture in line 44. This gas mixture is heated in recuperator 24 to produce the cooled (in comparison with the feed gas stream in line 42) and cleaned recycle gas mixture in line 44.

TABLE I

| Line No | Pressure psia | Temperature °F | Amount, Lb. Moles/ 100 lb. Feed Oil |
|---|---|---|---|
| 43 | 1220 | 580 | 10.150 |
| 38 | 1215 | 2605 | 14.268 |
| 42 | 1215 | 1800 | 24.418 |
| 60 | 76 | 687 | 24.418 |
| 61 | 61 | 300 | 24.418 |
| 82 | 46 | 100 | 21.673 |
| 86 | 70 | 100 | 20.906 |
| 105 | 1300 | 497 | 7.816 |
| 111 | 1240 | 100 | 2.334 |
| 44 | 1235 | 276 | 10.150 |
| 109 | 1600 | 561 | 13.090 |

In the above example expansion turbine 50 generates 83.3 horse power for each 100 pounds per hour (lb/hr) of feed oil introduced through line 25. This leaves a net power generation of 26.4 horse power per 100 lbs/hr of feed oil after supplying the power required by compressors 54 and 55. Since oxygen is supplied at system pressure, compressor 56 is omitted. Further, the synthesis gas product in line 109 has been raised to a process pressure of 1600 psia. In comparison, synthesis gas would be delivered at only 1170 psia had there been employed a more conventional sequence consisting of gas generation at 1215 psia, cooling, carbon scrubbing, and acid gas removal.

The amount of useful power obtained by the subject process is greater than that obtained for a closed Brayton cycle. The entire heat input in the closed Brayton cycle is obtained by expensive and inefficient indirect gas to gas heat exchange in contrast with the subject process which utilizes the inherent heat content of the process fluid.

The subject process includes the following advantages:

(1) By the subject process a worthwhile increase in power production over the closed Brayton-cycle is realized; and an expensive high temperature high pressure gas to gas heat exchanger may be eliminated.

(2) In comparison with some other power systems, the large entropy gain associated with the large temperature difference between the gas generator and the turbine inlet may be avoided.

(3) The working fluid for the power cycle is produced by the process and has about the same composition as the product gas. This eliminates the cost, inventory, make-up, contamination and storage of a separate working fluid.

(4) By eliminating a separate working fluid, there is a reduction in the necessary amount of heat transfer between streams and in the thermo-dynamic losses thereby occasioned.

(5) Acid-gas, when present in the process gas stream, may be removed. The lives of the turbines and the compressors in the system are thereby increased; the product gas is suitable for downstream catalytic reactions, and environmental pollution is avoided.

(6) Power is obtained from the large molal increase that is associated with the partial oxidation of hydrocarbonaceous fuels, in addition to the power obtained from the elevated pressure and sensible heat in the hot raw partial oxidation product gas.

The process of the invention has been described generally and by examples with reference to materials of particular compositions for purposes of clarity and illustration only. It will be apparent to those skilled in the art from the foregoing that various modifications of the process and materials disclosed herein can be made without departure from the spirit of the invention.

We claim:

1. A process for the production of a product gas stream comprising $H_2$ and CO along with power comprising; (1) producing a raw gas stream comprising $H_2$, CO, $CO_2$, $H_2O$, and at least one member of the group $H_2S$, COS, $CH_4$, $N_2$, and A, and containing entrained particulate carbon and other solids in the reaction zone of a free-flow gas generator by the partial oxidation of a hydrocarbonaceous fuel with a free-oxygen containing gas and with or without a temperature moderator, at a temperature in the range of about 1800° to 3000° F.

and a pressure in the range of about 10 to 200 atmospheres; (2) removing a portion of the entrained solids from the raw gas stream from (1), and in a mixing zone mixing all of said raw gas stream with a cooled, cleaned and compressed recycle gas stream from (6); wherein the volume ratio of said recycle gas stream to the total gas mixture leaving said mixing zone is in the range of about 0.2 to 0.8; (3) expanding the mixture of gas streams from (2) in a power recovery expansion turbine means at an inlet temperature in the range of about 1000° to 2400° F., and above the dew point and at an inlet pressure in the range of about 10 to 200 atm. abs.; (4) removing a stream of gas from said turbine means in (3) at a pressure in the range of about 2 to 15 atm. abs. and a temperature in the range of about 350° to 1000° F., and cooling said gas stream; (5) cleaning any remaining entrained particulate solids from the cooled gas stream from (4), and condensing and removing water; (6) compressing the gas stream from (5) to a pressure greater than the pressure in said gas generator in a gas compression zone comprising at least one gas compressor operated from power produced by said expansion turbine, and passing a portion of the compressed gas stream into said mixing zone in (2) as said recycle gas stream; and (7) removing the remainder of said compressed gas stream from said compression zone in (6) as said product gas stream.

2. The process of claim 1 where in step (2) the amounts and temperatures of the recycle gas stream and the raw gas stream from step (1) are such that the mixture of these gas streams is introduced into the turbine means in step (3) with an inlet temperature in the range of about 1400° to 2200° F.

3. The process of claim 1 with the addition of water or steam to the recycle gas stream from step (6).

4. The process of claim 1 provided with the additional step of removing in an absorption zone any acid-gases from the cleaned and dewatered gas stream from step (5) prior to being introduced into the compression zone in step (6).

5. The process of claim 1 where in step (5) prior to condensing said water, the gas stream is subjected to catalytic water-gas shift reaction.

6. The process of claim 1 provided with the additional step of removing in an absorption zone any acid gases from the gas stream leaving step (5).

7. The process of claim 1 provided with the additional step of removing in an absorption zone any acid gases from the compressed recycle gas stream leaving step (6).

8. The process of claim 5 provided with the additional step of removing in an acid-gas absorption zone any acid gases from the water-gas shifted gas stream.

9. The process of claim 1 provided with the additional step for producing electrical energy by coupling an electric generator to said power-recovery turbine means.

10. The process of claim 1 wherein the free-oxygen containing gas is selected from the group consisting of air, oxygen-enriched air (more than 21 mole % $O_2$) and substantially pure oxygen (more than 95 mole % $O_2$).

11. The process of claim 1 wherein said hydrocarbonaceous fuel is a liquid hydrocarbon selected from the group consisting of liquefied petroleum gas, petroleum distillates and residues, gasoline, naphtha, kerosine, crude petroleum, asphalt, gas oil, residual oil, tar-sand oil, shale oil, coal derived oil, aromatic hydrocarbons such as benzene, toluene, xylene fraction, coal tar, cycle gas oil from fluid-catalytic-cracking operation, furfural extract of coker gas oil, and mixtures thereof.

12. The process of claim 1 wherein said hydrocarbonaceous fuel is a gaseous hydrocarbon.

13. The process of claim 1 wherein said hydrocarbonaceous fuel is an oxygenated hydrocarbonaceous organic material selected from the group consisting of carbohydrates, cellulosic materials, aldehydes, organic acids, alcohols, ketones, oxygenated fuel oil, waste liquids and by-products from chemical processes containing oxygenated hydrocarbonaceous organic materials, and mixtures thereof.

14. The process of claim 1 where in step (2) said entrained solids are separated in a slag pot and are selected from the group consisting of particulate carbon, ash, slag, scale, refractory, metal constituents, and mixtures thereof.

15. The process of claim 1 wherein said hydrocarbonaceous fuel is a pumpable slurry of solid carbonaceous fuel selected from the group consisting of coal, lignite, wood pulp, particulate carbon, petroleum coke, and concentrated sewer sludge and mixtures thereof, in a vaporizable carrier such as water, liquid hydrocarbon and mixtures thereof.

16. The process of claim 1 wherein said product gas stream is synthesis gas or fuel gas.

17. A process for the production of a $H_2$ and CO-containing gas stream along with power comprising: (1) producing a raw gas stream comprising $H_2$, CO, $CO_2$, $H_2O$, and at least one member of the group $H_2S$, COS, $CH_4$, $N_2$, and A, and containing entrained particulate solids in the reaction zone of a free-flow gas generator by the partial oxidation of a hydrocarbonaceous fuel with a free-oxygen containing gas and with or without a temperature moderator, at a temperature in the range of about 1800° to 3000° F. and a pressure in the range of about 10 to 200 atmospheres; (2) removing a portion of the entrained solids from the hot raw process gas stream from (1); (3) cooling the gas stream from (2) to a temperature in the range of about 1000° to 2400° F. and above the dew point by introducing water in liquid phase in the gas stream from (2) and then cooling the gas stream to a temperature in the range of about 350° to 1000° F. by expanding said gas stream in a power recovery turbine means from an inlet pressure in the range of about 10 to 200 atm. abs. to an outlet pressure in the range of about 2 to 15 atm. abs.; wherein prior to introducing said water into said gas stream from (2) said water is preheated by indirect heat exchange with the gas stream leaving said turbine means; (4) cooling and cleaning the remaining entrained particulate solids from the turbine exhaust gas stream leaving (3), and condensing and removing water from said gas stream; (5) compressing the gas stream from (4) in a gas compression zone comprising at least one gas compressor operated from power produced by said expansion turbine; and (6) removing the compressed gas stream from said compression zone in (5) as said $H_2$ and CO-containing product gas stream.

18. The process of claim 17 where at least a portion of the water introduced into the gas stream in step (3) to effect cooling is obtained from the water condensed from the gas stream in step (4).

19. The process of claim 17 where in step (4) prior to condensing said water, the gas stream is subjected to catalytic water-gas shift reaction.

20. The process of claim 19 provided with the additional step of removing in an acid-gas absorption zone any acid gases from the water-gas shifted gas stream.

21. The process of claim 17 provided with the additional step of removing acid-gases in an absorption zone from the gas stream from step (4) prior to introducing said gas stream into the compression zone in step (5).

22. The process of claim 17 provided with the additional step of removing in an absorption zone any acid gases from the gas stream leaving the compression zone in step (5).

* * * * *